(12) United States Patent
Yu et al.

(10) Patent No.: US 7,354,185 B2
(45) Date of Patent: Apr. 8, 2008

(54) LIGHT GUIDING PLATE AND BACKLIGHT MODULE USING THE SAME

(75) Inventors: Tai-Cherng Yu, TU-Cheng (TW); Charles Leu, Fremont, CA (US); Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 46 days.

(21) Appl. No.: 11/175,771

(22) Filed: Jul. 6, 2005

(65) Prior Publication Data
US 2006/0013017 A1   Jan. 19, 2006

(30) Foreign Application Priority Data
Jul. 16, 2004   (TW) .............. 93121314 A

(51) Int. Cl.
*F21V 7/04*   (2006.01)
*G02B 6/10*   (2006.01)

(52) U.S. Cl. ............... 362/626; 362/623; 362/625; 385/129

(58) Field of Classification Search ............ 362/628, 362/606, 340, 623, 608, 615, 619, 620, 625, 362/626; 346/61–71; 385/146, 129
See application file for complete search history.

(56) References Cited

U.S. PATENT DOCUMENTS

| | | | |
|---|---|---|---|
| 5,779,338 A | 7/1998 | Ishikawa et al. ............ 362/625 |
| 6,074,069 A | 6/2000 | Chao-Ching et al. | |
| 6,155,692 A * | 12/2000 | Ohkawa ................ 362/619 |
| 6,256,447 B1 * | 7/2001 | Laine ................... 385/146 |
| 6,295,104 B1 * | 9/2001 | Egawa et al. ............ 349/63 |
| 6,578,977 B2 * | 6/2003 | Egawa et al. ........... 362/610 |
| 6,601,961 B1 * | 8/2003 | Masaki .................. 362/26 |
| 6,729,737 B2 * | 5/2004 | Jeon et al. .............. 362/617 |
| 6,828,007 B2 * | 12/2004 | Obuchi et al. ........... 428/156 |
| 6,986,600 B2 * | 1/2006 | Yamada et al. .......... 362/626 |
| 7,040,796 B2 * | 5/2006 | Sugiura et al. .......... 362/608 |
| 7,104,679 B2 * | 9/2006 | Shin et al. .............. 362/626 |
| 7,108,416 B1 * | 9/2006 | Osawa ................... 362/618 |
| 2002/0041349 A1 * | 4/2002 | Ohkawa ................. 349/65 |
| 2003/0169584 A1 * | 9/2003 | Miyashita ............... 362/31 |
| 2006/0104089 A1 * | 5/2006 | Feng et al. ............. 362/608 |

FOREIGN PATENT DOCUMENTS

| | | |
|---|---|---|
| CN | 1441298 A | 9/2003 |
| JP | 10-208529 A | 8/1998 |
| JP | 2004-111383 | 4/2004 |

* cited by examiner

*Primary Examiner*—Jong-Suk (James) Lee
*Assistant Examiner*—David Crowe
(74) *Attorney, Agent, or Firm*—Morris Manning Martin LLP; Tim Tingkang Xia, Esq.

(57) ABSTRACT

A back light module (3) includes a light guide plate (31) and a light source (30). The light guide plate includes a light incident surface (311), a light emitting surface (313), and a bottom surface (312) opposite to the light emitting surface. The bottom surface has a plurality of dissymmetric protrusions (314). The dissymmetric protrusions defines an angle $\alpha$ between a first side (3142) thereof and a reference line of a length of the light guiding plate, and an angle $\beta$ between a second side (3144) thereof and the reference line. The light guiding plate has high brightness and uniformity.

9 Claims, 5 Drawing Sheets

LIGHT GUIDING PLATE AND BACKLIGHT MODULE USING THE SAME

FIELD OF THE INVENTION

The present invention relates to light guiding plates employed in backlight modules, the backlight module typically being part of a liquid crystal display (LCD).

BACKGROUND

Because of its being thin, light in weight, and drivable by a low voltage, an LCD device is extensively employed in various electronic devices.

In a typical LCD device, a backlight module having a light source and a light guiding device is used to provide the needed illumination. The light source emits light beams into the light guiding device, which then transmits the light beams to illuminate liquid crystal molecules in a liquid crystal panel. It is important that the light guiding device transmits the light beams to the liquid crystal panel uniformly.

Referring to FIG. 3, this is a schematic, side view of a typical backlight module 2. The backlight module 2 includes a light guiding plate 21 and a linear light source 20. The light guiding plate 21 includes an incident surface 211, a light emitting surface 213 adjacent to the light incident surface 211, and a sawtooth bottom reflective surface 212 opposite to the light emitting surface 213. The light source 20 is arranged in the vicinity of the incident surface 211.

FIG. 4 is an enlarged view of part of the backlight module of FIG. 3, showing essential optical paths thereof. AB1, AB2, and AB3 represent light beams emitted by the light source 20 that enter the light guide plate 21, and are reflected by the protrusions 214 of the reflective surface 212. The light beams AB1, AB2, and AB3 then transmit to the light emitting surface 213, and emit out of the light guiding plate 21 for illuminating an LCD device.

The protrusions 214 of the reflective surface 212 have a regular configuration. When the light beam AB3 is reflected by one of the protrusions 214 that is far away from the light source 20, the light beam AB3 has a larger incident angle than that of the light beams AB1 or AB2 that are reflected by protrusions 214 nearer to the light source 20. This means that the light beam AB3 is liable to be totally internally reflected within the light guiding plate 21. Thus, at least some of the energy of the light beam AB3 is apt to be lost. Effective utilization of the light beams of the light source 20 may be less than satisfactory.

What is needed, therefore, is a new light guiding plate and a corresponding backlight module that overcome the above-described problems.

SUMMARY

A light guiding plate according to a preferred embodiment of the invention includes a light incidence surface, a light emitting surface, and a bottom surface opposite to the light emitting surface. The bottom surface defines a plurality of dissymmetric protrusions and the dissymmetric protrusions defines an angle α between a first side thereof and a reference line of a length of the light guiding plate and an angle β between a second side thereof and the reference line.

A backlight module according to another preferred embodiment of the invention includes the above-described light guiding plate, and a light source is disposed adjacent to the light incidence surface of the light guiding plate.

The light guiding plate and the backlight module provide a high brightness and uniformity of output light.

Other advantages and novel features of the present invention will become more apparent from the following detailed description when taken in conjunction with the accompanying drawings.

DETAILED DESCRIPTION OF PREFERRED EMBODIMENTS

Figure 1:
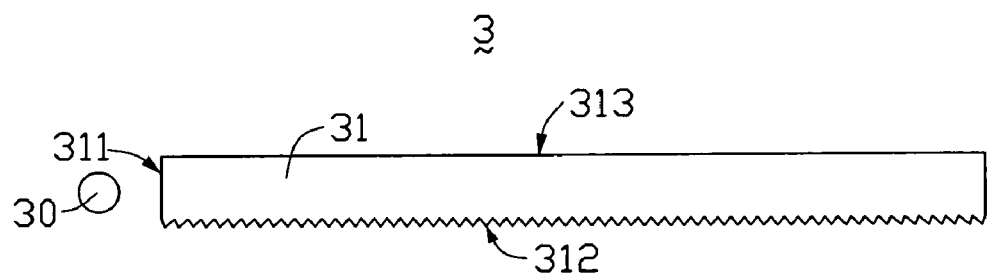
FIG. 1 is a schematic, side view of a backlight module according to a first embodiment of the present invention.

Referring to FIG. 1, a backlight module 3 of a display device according to a first preferred embodiment of the present invention is shown. The backlight module 3 includes a plate-like light guiding member 31 and a light source 30. The light guiding plate 31 includes at least a light incident surface 311, a light emitting surface 313 located adjacent to the light incident surface 311, and a bottom surface 312 parallel and opposite to the light emitting surface 313.

Figure 2:
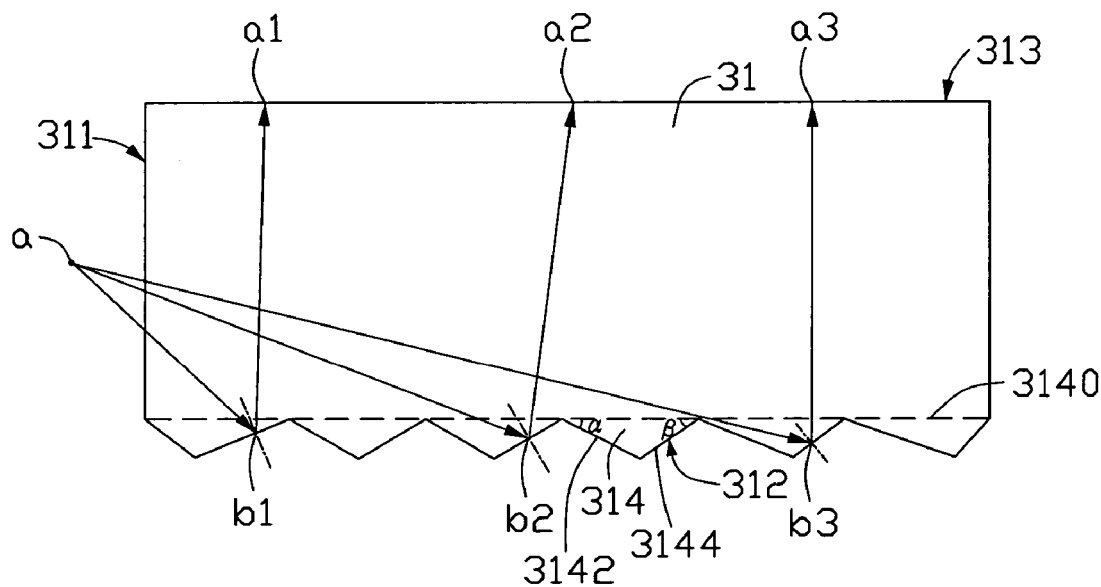
FIG. 2 is an enlarged view of part of the backlight module of FIG. 1, showing essential optical paths thereof.
Figure 3:
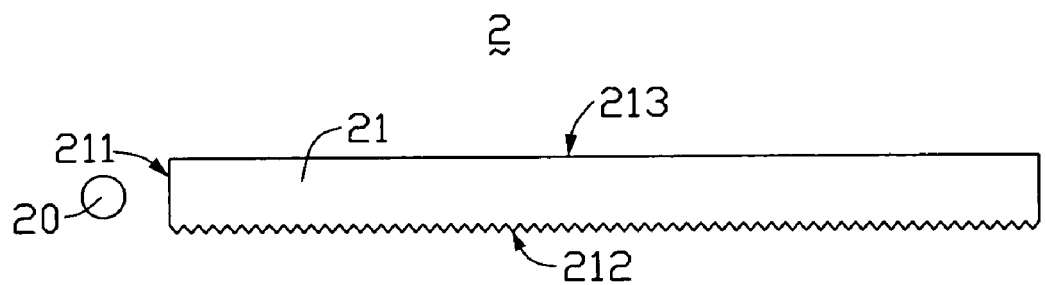
FIG. 3 is a schematic, side view of a conventional backlight module.
Figure 4:
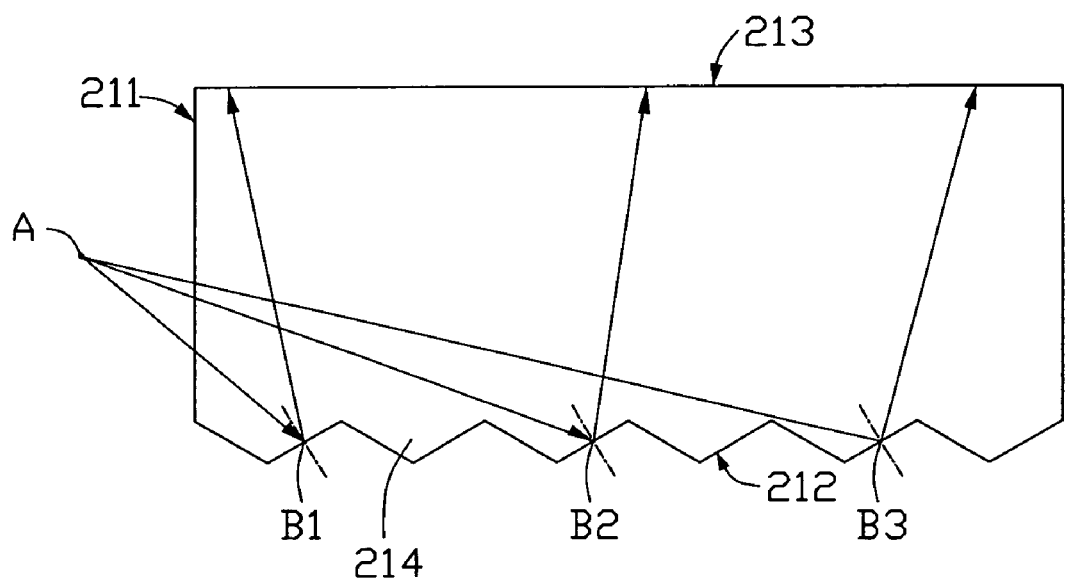
FIG. 4 is an enlarged view of part of the backlight module of FIG. 3, showing essential optical paths thereof.

Referring also to FIG. 2, this is an enlarged view of part of the backlight module 3, and shows essential optical paths thereof. The bottom surface 312 has a plurality of diffusing means, for example protrusions 314, continuously disposed therealong. Each of the protrusions 314 is dissymmetric, and protrudes downwardly from a main body of the light guiding plate 31. Each of the protrusion 314 defines an angle α between a first side 3142 of the protrusion 314 and a horizontal line 3140, and an angle β between a second side 3144 of the protrusion 314 and the horizontal line 3140. For protrusions 314 nearer to the light source 30, the angle α is larger than the angle β. For protrusions 314 distal from the light source 30, the angle α is smaller than the angle β. In other words, the angle α progressively decreases along a direction away from the light incident surface 311, and the angle β correspondingly progressively increases along the direction away from the light incident surface 311.

In a preferred embodiment, for the protrusion 314 nearest to the light incident surface 311, the angle α is four times the value of the angle β, and for the protrusion 314 farthest from the light incident surface 311, the angle α is a quarter of the value of the angle β.

The light guiding plate 31 can be made of any one or more of polymeric resins, such as polypropylene resins, polyethylene resins, cymene polypropylene resins, carbonic esters, etc.

The light source 30 is disposed adjacent to the light incidence surface 311 of the light guiding plate 31.

In FIG. 2, items ab1, ab2, and ab3 represent light beams emitted by the linear light source 30 that enter the light guide plate 31 and are reflected by the protrusions 314 of the bottom surface 312. After reflection, the light beams ab1, ab2, and ab3 transmit to the light emitting surface 313, and emit out of the light guiding plate 31 for illumination of a corresponding LCD device. The light beam ab3 is able to be reflected by a protrusion 314 located far away from the light source 30, and transmit to the light emitting surface 313 accordingly. That is, the light beam ab3 is able to reach the protrusion 314 with a relatively small incident angle, such that total internal reflection of the light beam ab3 within the light guide plate 31 is avoided. The configuration of the protrusions 314 reduces the possibility of distal-traveling light beams such as the light beam ab3 undergoing total internal reflection.

Figure 5:
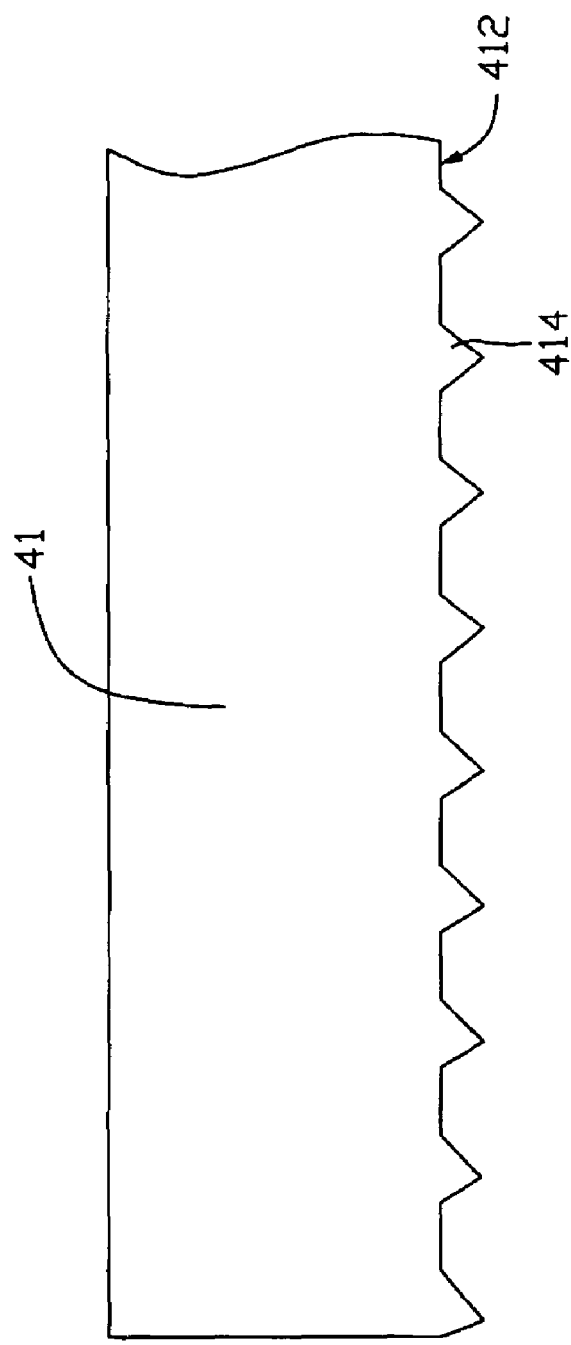
FIG. 5 is a schematic, side view of part of a backlight module according to a second embodiment of the present invention, showing uniform spacing between adjacent protrusions of a light guide plate thereof.
Figure 6:
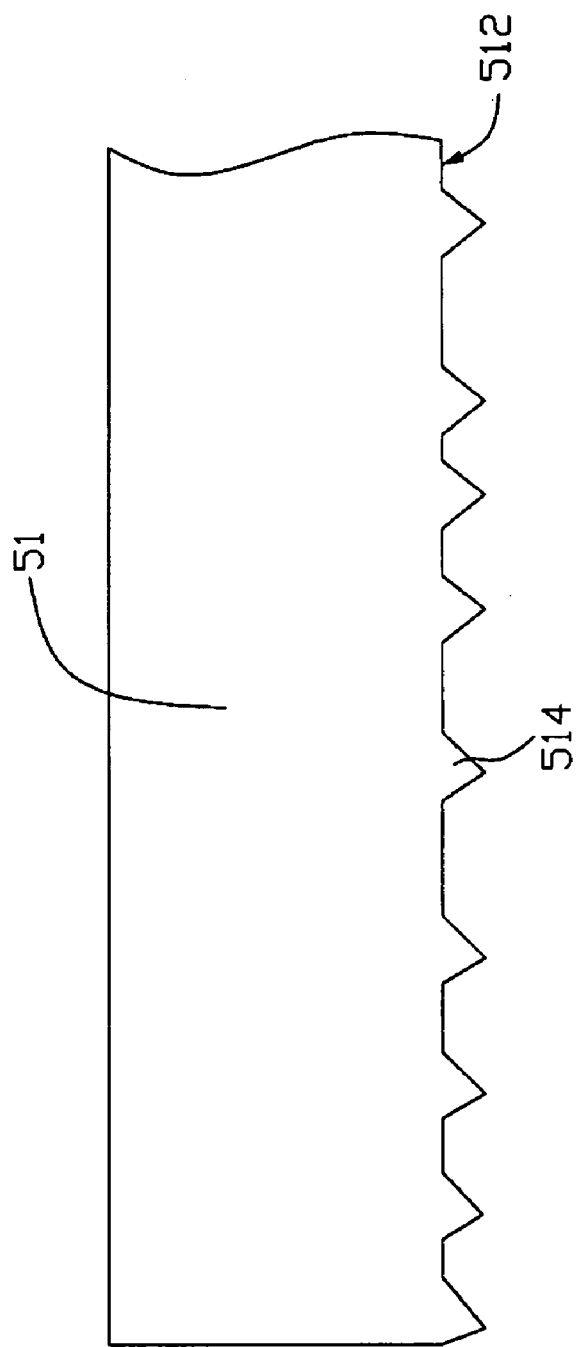
FIG. 6 is a schematic, side view of part of a backlight module according to a third embodiment of the present invention, showing non-uniform spacing between adjacent protrusions of a light guide plate thereof.
Figure 7:
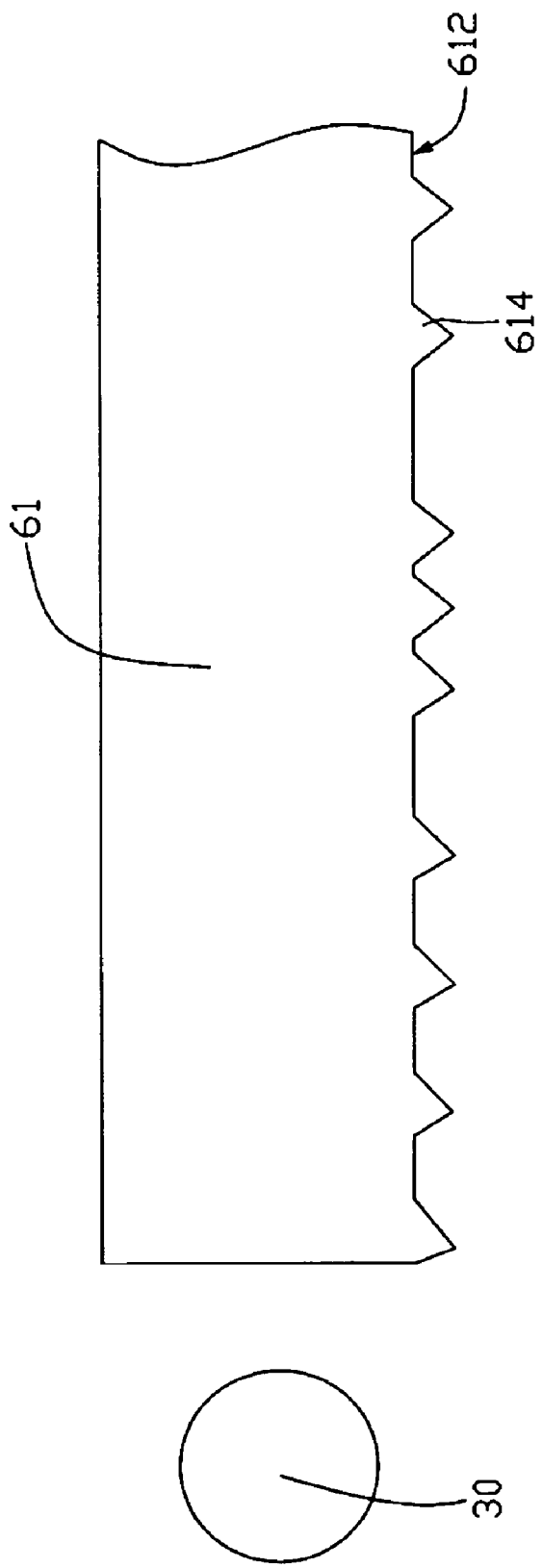
FIG. 7 is a schematic, side view of part of a backlight module according to a fourth embodiment of the present invention, showing uniform and non-uniform spacing between adjacent protrusions of a light guide plate thereof.

Various modifications and alterations are possible within the ambit of the invention herein. For example, in second, third, and fourth preferred embodiments of the present invention, as shown in FIGS. 5-7 respectively, the protrusions 414, 514, and 614 may be disposed at intervals along bottom surfaces 412, 512, 612 of the light guiding plates 41, 51, 61 respectively. In another example, the protrusions 314 may be replaced with concavities formed at the bottom surface 312.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A light guiding plate, comprising:
   a light incident surface;
   a light emitting surface; and
   a bottom surface parallel and opposite to the light emitting surface, the bottom surface defining a plurality of dissymmetric protrusions, and a common reference line shared by the protrusions, each of the protrusions comprising a first side close to the light incident surface, and a second side away from the light incident surface, and each of the protrusions defining an angle $\alpha$ between the first side and the reference line, and an angle $\beta$ between the second side and the reference line, wherein the angle $\alpha$ of the protrusions progressively decreases along a direction away from the light incident surface, the angle $\beta$ of the protrusions progressively increases along the direction away from the light incident surface, and for the protrusion nearest to the light incident surface, the angle $\alpha$ is four times the value of the angle $\beta$.

2. The light guiding plate according to claim 1, wherein the protrusions are continuously disposed along the bottom surface.

3. The light guiding plate according to claim 1, wherein the protrusions are disposed at intervals along the bottom surface.

4. The light guiding plate according to claim 1, wherein the protrusions are V-shaped.

5. A backlight module, comprising:
   a light guiding plate comprising a light incident surface, a light emitting surface, and a bottom surface opposite to the light emitting surface, the bottom surface defining a plurality of dissymmetric protrusions, and a common reference line shared by the protrusions, each of the protrusions comprising a first side close to the light incident surface, and a second side away from the light incident surface, and each of the protrusions defining an angle $\alpha$ between the first side and the reference line, and an angle $\beta$ between the second side and the reference line, wherein the angle $\alpha$ of the protrusions progressively decreases along a direction away from the light incident surface, the angle $\beta$ of the protrusions progressively increases along the direction away from the light incident surface, and for the protrusion nearest to the light incident surface, the angle $\alpha$ is four times the value of the angle $\beta$; and
   a light source disposed adjacent to the light incident surface.

6. The backlight module according to claim 5, wherein the protrusions are continuously disposed along the bottom surface.

7. The backlight module according to claim 5, wherein the protrusions are disposed at intervals along the bottom surface.

8. The backlight module according to claim 5, wherein the protrusions are V-shaped.

9. A light guiding plate, comprising:
   a light incident surface;
   a light emitting surface; and
   a bottom surface parallel and opposite to the light emitting surface, the bottom surface defining a plurality of dissymmetric protrusions, and a common reference line shared by the protrusions, each of the protrusions comprising a first side close to the light incident surface, and a second side away from the light incident surface, and each of the protrusions defining an angle $\alpha$ between the first side and the reference line, and an angle $\beta$ between the second side and the reference line, wherein the angle $\alpha$ of the protrusions progressively decreases along a direction away from the light incident surface, and the angle $\beta$ of the protrusions progressively increases along the direction away from the light incident surface, and for the protrusion farthest from the light incident surface, the angle $\alpha$ is a quarter of the value of the angle $\beta$.

* * * * *